US012794362B2

(12) United States Patent

Chew et al.

(10) Patent No.: US 12,794,362 B2

(45) Date of Patent: Nov. 10, 2026

(54) FEEDFORWARD REGULATED CIRCUITRY SYSTEM AND METHOD FOR REGULATING POWER SUPPLY USING THEREOF

(71) Applicant: SKYECHIP BERHAD, Bayan Lepas (MY)

(72) Inventors: Jaw Wen Chew, Bayan Lepas (MY); Tze Jian Chow, Bayan Lepas (MY); How Hwan Wong, Bayan Lepas (MY); Chun Wei Lee, Bayan Lepas (MY)

(73) Assignee: Skyechip Berhad (MY)

( * ) Notice: Subject to any disclaimer, the term of this patent is extended or adjusted under 35 U.S.C. 154(b) by 149 days.

(21) Appl. No.: 18/814,902

(22) Filed: Aug. 26, 2024

(65) Prior Publication Data

US 2025/0253771 A1 Aug. 7, 2025

(30) Foreign Application Priority Data

Feb. 2, 2024 (MY) ............................ PI2024000736

(51) Int. Cl.

*H02M 3/155* (2006.01)
*H02M 1/00* (2006.01)

(52) U.S. Cl.

CPC ......... *H02M 3/155* (2013.01); *H02M 1/0016* (2021.05)

(58) Field of Classification Search

CPC ..... G05F 1/00; G05F 1/10; G05F 1/12; G05F 1/46; G05F 1/455; G05F 1/45; G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; G05F 1/463; G05F 1/468; G05F 1/461; G05F 1/465; G05F 1/562; G05F 1/565; G05F 1/567; G05F 1/569; G05F 1/571; G05F 1/573; G05F 1/5735; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156;

(Continued)

(56) References Cited

U.S. PATENT DOCUMENTS 6,288,572 B1 * 9/2001 Nowka .............. H03K 19/0963 326/14
6,400,207 B1 * 6/2002 Ivanov ...................... G05F 3/30 327/377

(Continued)

*Primary Examiner* — Crystal L Hammond
*Assistant Examiner* — Nusrat Quddus
(74) *Attorney, Agent, or Firm* — Jayne Saydah

(57) ABSTRACT

The present invention relates to a circuitry system (200) for regulating power supply, characterized by: a feedforward amplifier (100) comprising a clock generator (10) and a load circuit (20) for producing current during functional requirements; wherein the clock generator (10) comprises a toggle detector circuit (12) for generating feedforward enable signal when toggling input clock signal is detected; wherein the load circuit (20) comprises a feedforward pass gate for receiving feedforward enable signal, a load circuitry (24), a variable bias voltage controller and a level shifter (22) for controlling the feedforward pass gate.

7 Claims, 11 Drawing Sheets

(58) Field of Classification Search
CPC ............... H02M 3/158; H02M 3/1588; H02M 2003/1566; H02M 3/1582; H02M 2003/1557; H05B 39/048; B23K 11/24; H04B 2215/069
See application file for complete search history.

(56) References Cited

U.S. PATENT DOCUMENTS

| | | | | |
|---|---|---|---|---|
| 11,228,291 | B2 * | 1/2022 | Kusuda | H03F 1/26 |
| 11,245,410 | B1 * | 2/2022 | Dalla Longa | H03M 1/66 |
| 11,846,600 | B2 * | 12/2023 | Lesso | G01N 27/3273 |
| 12,253,487 | B2 * | 3/2025 | Lesso | G01N 27/3273 |
| 12,535,449 | B2 * | 1/2026 | Lesso | G01N 27/3273 |
| 2008/0061883 | A1 * | 3/2008 | Kataria | H03F 3/50 330/289 |
| 2011/0018507 | A1 * | 1/2011 | McCloy-Stevens | H02M 3/1588 323/271 |
| 2012/0121274 | A1 | 5/2012 | Fludger et al. | |
| 2014/0232464 | A1 * | 8/2014 | Song | H03F 3/45179 330/258 |
| 2022/0163988 | A1 | 5/2022 | Zhao et al. | |
| 2024/0395295 | A1 * | 11/2024 | Gruddanti | G11C 7/222 |

* cited by examiner

FEEDFORWARD REGULATED CIRCUITRY SYSTEM AND METHOD FOR REGULATING POWER SUPPLY USING THEREOF

CROSS-REFERENCE TO RELATED APPLICATION

This application claims priority to and the benefit of Malaysian Patent Application No. PI2024000736 filed in the Malaysian Intellectual Property Office on Feb. 2, 2024, the entire contents of which are incorporated herein by reference in its entirety.

TECHNICAL FIELD

The present invention relates generally to high-speed CMOS clocking circuitries particularly addresses the challenges associated with power supply regulations in such circuits.

BACKGROUND ART

In contemporary digital systems, the pivotal function of high-speed CMOS clocking circuits is to synchronize various components for seamless operation. However, the persistent pursuit of enhanced clock frequencies and diminished power consumption introduces challenges in maintaining stable power supplies, particularly amid variations in the manufacturing process.

Traditional clocking circuits often encounter difficulties adapting to process-dependent fluctuations, resulting in potential timing errors and performance degradation. Consequently, there arises a necessity for an inventive approach to power supply regulation that surpasses the constraints imposed by manufacturing processes, thereby ensuring both stability and optimal circuit functionality. These imperative underscores a central focus in current technological advancements.

There have been a few solutions provided for an analog feedforward system in high-speed CMOS clocking circuit in which few of them are discussed below:

US2012121274A1 disclosed a receiver designed for an optical communications system, aiming to rectify distortions in a received signal. The system incorporates a clock recovery mechanism that employs both feedback and feedforward systems. The feedback loop includes a phase detector and a delay element, responsible for postponing the output of the distortion correction system. Notably, the feedback loop operates at a substantially lower bandwidth compared to the feedforward path. The patent also outlines methods for optimizing tap weights and acquiring initial tap weights.

US2022163988A1 disclosed a digital comparator coupled to a set of pull-up resistors and a set of pull-down resistors, with both sets connected to an output terminal of a low dropout (LDO) regulator. Specifically, the digital comparator is equipped with an edge detector module, a consecutive two-edge detector module, and a consecutive three-edge detector module. The edge detector module is designed to take two clock signals as inputs. After undergoing processing by these three modules, the comparator adjusts the pull-up or pull-down status of the resistors at the output terminal of the LDO regulator based on the rising and falling edges of the received clock signals.

However, the aforementioned references and other conventional techniques continue to grapple with several challenges, prompting the objectives and features of the present invention to address these issues. Notably, industries like computer architecture face challenges associated with voltage droop and overshoot. Consequently, there is a discernible need for a solution tailored to overcome these specific problems, aiming to enhance the performance of high-speed CMOS clocking circuitries for more optimal operation.

SUMMARY OF THE INVENTION

The following presents a simplified summary of the invention in order to provide a basic understanding of some aspects of the invention. This summary is not an extensive overview of the invention. Its sole purpose is to present some concepts of the invention in a simplified form as a prelude to the more detailed description that is presented later.

It is an objective of the present invention to effectively counter supply voltage droop during dynamic current needs by activating feedforward based on input clock toggling.

A further objective of the present invention is to ensure efficient voltage domain transition and enhance voltage stabilization with a custom level shifter with thin gate and thick gate transistor.

Another objective of the present invention is to employ to the system a fixed bias reference with no requirement to do any periodic or real time calibration.

Accordingly, these objectives may be achieved by following the teachings of the present invention. The present invention discloses a circuitry system for regulating power supply, characterized by: a feedforward amplifier comprising a clock generator and a load circuit for producing current during functional requirements; wherein the clock generator comprises a toggle detector circuit for generating feedforward enable signal when toggling input clock signal is detected; wherein the load circuit comprises a feedforward pass gate for receiving the feedforward enable signal, a load circuitry, a variable bias voltage controller and a level shifter for controlling the feedforward pass gate.

The present invention also relates to a process for regulating power supply of a circuitry system using the feedforward amplifier, characterized by the steps of: activating feedforward pass gate of a load circuit; detecting toggling input clock signal by a toggle detector circuit; generating feedforward enable signal when toggling input signal is detected; and de-asserting feedforward enable signal when input clock signal is not toggling.

The foregoing and other objects, features, aspects, and advantages of the present invention will become better understood from a careful reading of a detailed description provided herein below with appropriate reference to the accompanying drawings.

BRIEF DESCRIPTION OF THE ACCOMPANYING DRAWING

So that the manner which the above recited features of the present invention can be understood in detail, a more particular description of the invention, briefly summarized above, may have been referred by embodiments, some of which are illustrated in the appended drawings. It is to be noted, however, that the appended drawings illustrate only typical embodiments of this invention and are therefore not to be considered limiting of its scope, for the invention may admit to other equally effective embodiments.

These and other features, benefits, and advantages of the present invention will become apparent by reference to the following text figure, with like reference numbers referring to like structures across the views, wherein.

DETAILED DESCRIPTION OF THE PREFERRED EMBODIMENTS

Figure 1:
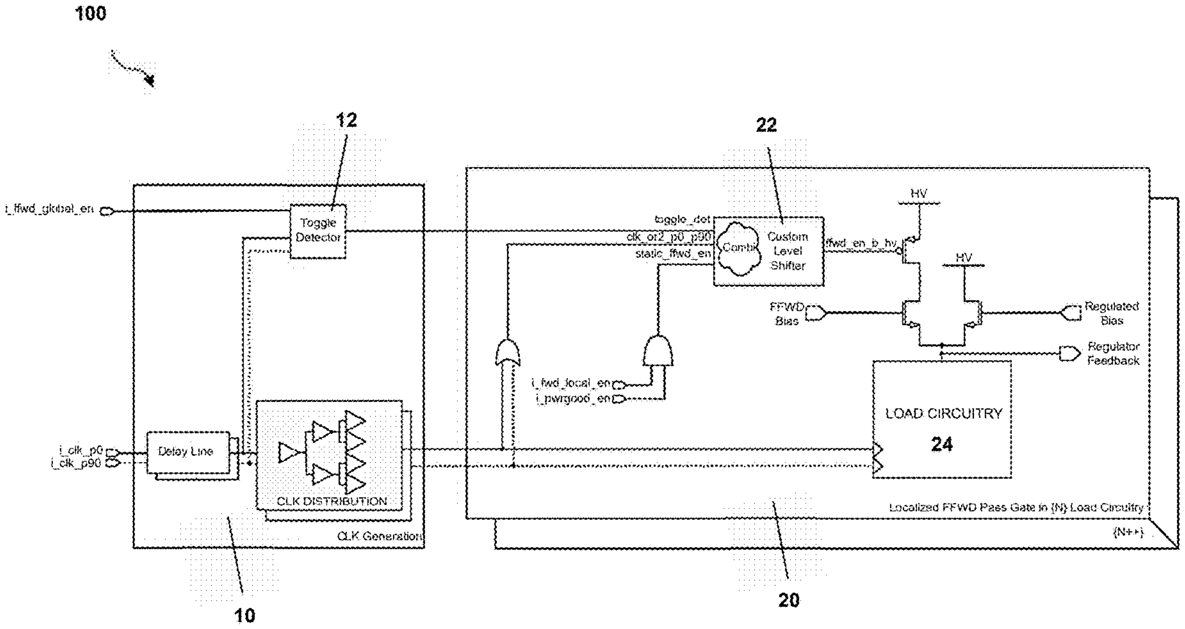
FIG. 1 illustrates an overall scheme of a feedforward amplifier in accordance with an embodiment of the present invention.

While the present invention is described herein by way of example using embodiments and illustrative drawings, those skilled in the art will recognize that the invention is not limited to the embodiments of drawing or drawings described and are not intended to represent the scale of the various components. Further, some components that may form a part of the invention may not be illustrated in certain figures, for ease of illustration, and such omissions do not limit the embodiments outlined in any way. It should be understood that the drawings and detailed descriptions are not intended to limit the invention to the particular form disclosed, but on the contrary, the invention is to cover all modifications, equivalents, and alternatives falling within the scope of the present invention as defined by the appended claims. As used throughout this description, the word “may” is used in a permissive sense (i.e. meaning having the potential to), rather than the mandatory sense, (i.e. meaning must). Further, the words “a” or “an” mean “at least one” and the word “plurality” means “one or more” unless otherwise mentioned. Furthermore, the terminology and phraseology used herein are solely used for descriptive purposes and should not be construed as limiting in scope. Language such as “including,” “comprising,” “having,” “containing,” or “involving,” and variations thereof, is intended to be broad and encompasses the subject matter listed thereafter, equivalents, and additional subject matter not recited, and is not intended to exclude other additives, components, integers, or steps. Likewise, the term “comprising” is considered synonymous with the terms “including” or “containing” for applicable legal purposes. Any discussion of documents, acts, materials, devices, articles, and the like are included in the specification solely for the purpose of providing a context for the present invention. It is not suggested or represented that any or all of these matters form part of the prior art base or were common general knowledge in the field relevant to the present invention.

In this disclosure, whenever a composition or an element or a group of elements is preceded with the transitional phrase “comprising”, it is be understood that we also contemplate the same composition, element, or group of elements with transitional phrases “consisting of”, “consisting”, “selected from the group of consisting of, “including”, or “is” preceding the recitation of the composition, element, or group of elements and vice versa.

The present invention is described hereinafter by various embodiments with reference to the accompanying drawing, wherein reference numerals used in the accompanying drawing correspond to the like elements throughout the description. This invention may, however, be embodied in many different forms and should not be construed as limited to the embodiment set forth herein. Rather, the embodiment is provided so that this disclosure will be thorough and complete and will fully convey the scope of the invention to those skilled in the art. In the following detailed description, numeric values and ranges are provided for various aspects of the implementations described. These values and ranges are to be treated as examples only and are not intended to limit the scope of the claims. In addition, a number of materials are identified as suitable for various facets of the implementations. These materials are to be treated as exemplary and are not intended to limit the scope of the invention.

Referring to the drawing as shown in FIGS. 1 to 11, the present invention will now be described in more detail.

Figure 2:
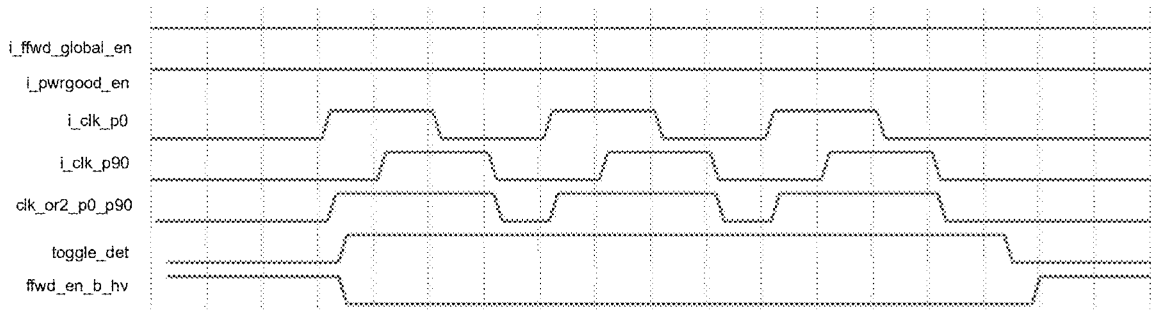
FIG. 2 is an overview of feedforward enable signal generation in accordance with an embodiment of the present invention.

A first embodiment of present invention relates to a circuitry system (200) or regulating power supply, characterized by: a feedforward amplifier (100) comprising a clock generator (10) and a load circuit (20) for producing current during functional requirements; wherein the clock generator 10 comprises a toggle detector circuit (12) for generating feedforward enable signal when a toggling input clock signal is detected; wherein the load circuit (20) comprises a feedforward pass gate for receiving feedforward enable signal, a load circuitry (24), a variable bias voltage controller and a level shifter (22) for controlling the feedforward pass gate. The feedforward amplifier (100) of the present invention is depicted in FIG. 1. FIG. 2 illustrates clock signals during feedforward enable signal generation.

A second embodiment of the present invention relates to a process for regulating power supply of a circuitry system (200) using the feedforward amplifier (100) of the present invention, characterized by the steps of: activating feedforward pass gate of a load circuit (20); detecting toggling input clock signal by a toggle detector circuit (12); generating feedforward enable signal when toggling input clock signal is detected, and de-asserting feedforward enable signal when input clock signal is not toggling.

Figure 8:
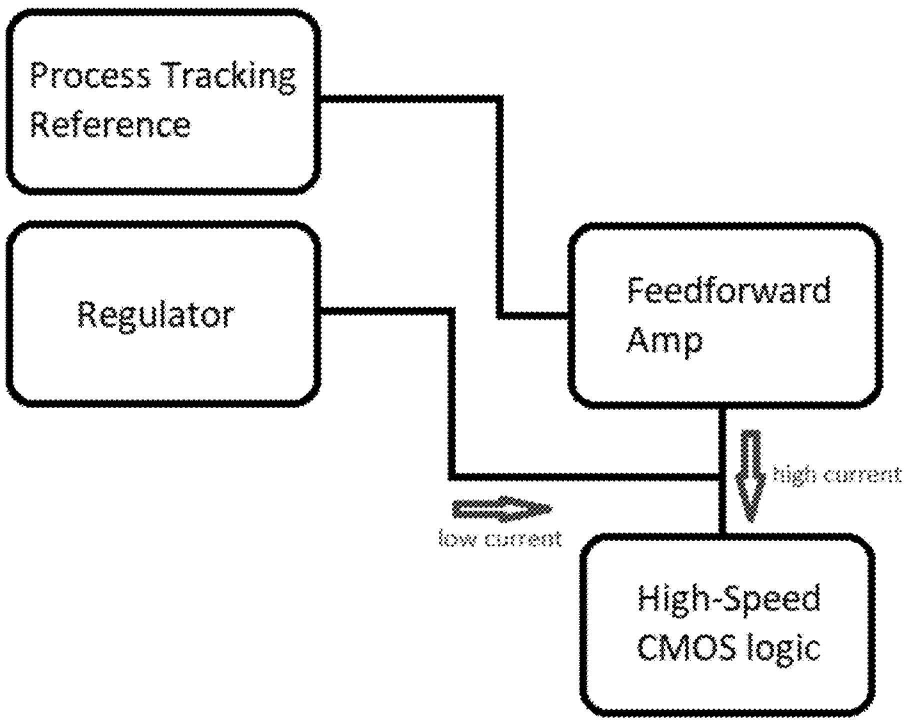
FIG. 8 is flowchart of the overall process of a circuitry system in accordance with an embodiment of the present invention.

In accordance with an embodiment of the present invention, the feedforward amplifier (100) is connected to a reference voltage tracker having same bandgap voltage with a regulator as an input voltage, therefore variations on bandgap does not affect the performance and calibration of the feedforward circuitries. The connectivity is illustrated in FIG. 8.

Figure 6:
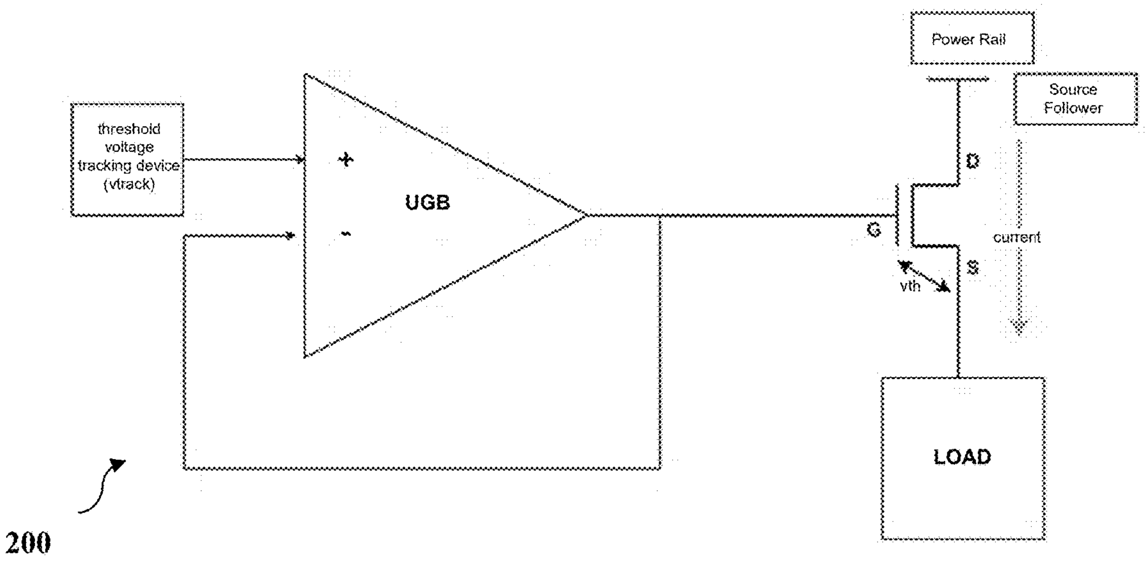
FIG. 6 is a schematic of process tracking feedforward bias signal in accordance with an embodiment of the present invention.

In accordance with an embodiment of the present invention, the circuitry system (200) is a CMOS clocking circuit. Further, the circuitry system (200) provides solution of the feedforward amplifier (100) that can counter voltage droop and overshoot that scales with different process corners to reduce area usage and calibration time. The overview of the configuration is illustrated in FIG. 6.

Figure 3:
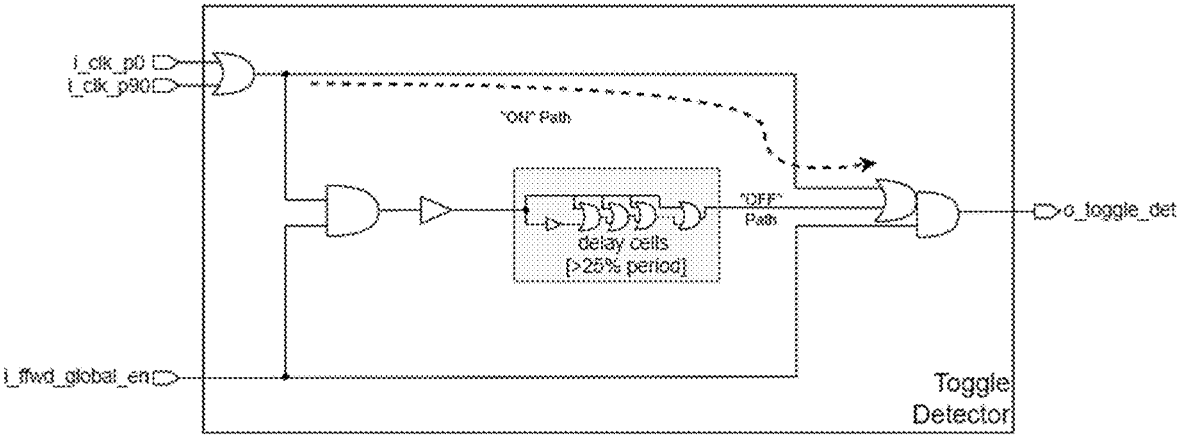
FIG. 3 is a detailed schematic of a toggle detector circuit in accordance with an embodiment of the present invention.
Figure 4:
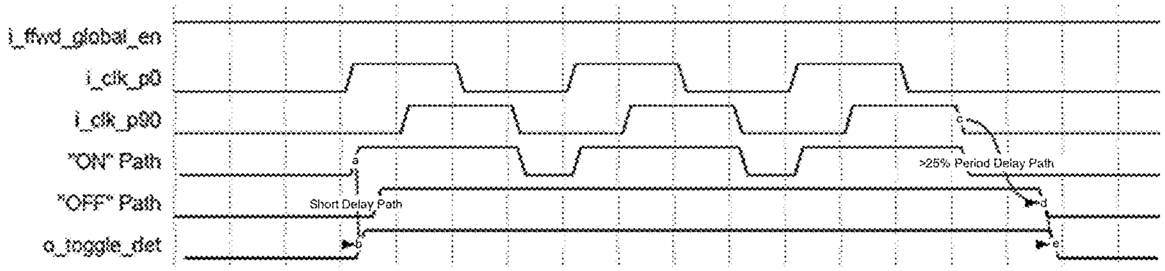
FIG. 4 illustrates internal waveforms of toggle detector circuit for toggle detection signal generation in accordance with an embodiment of the present invention.

In accordance with an embodiment of the present invention, the toggle detector circuit (12) comprises a delay cell for delay in signal propagation and manages synchronization between different clock domains, as shown in FIG. 3. For instance, whenever a logic "1" is produced from the OR gate between phase 0 and 90 input clocks, the output of toggle detector circuit (12) will transition to logic "1" through the shorter "ON" path. The "OFF" path generated by the delay cells pushes only the falling edge and preset the internal nodes whenever the input clocks are logic "1". This eliminates the risks of triggering logic "0" glitch if the delayed falling edge is aligned with the logic "0" pulse of OR gate output. Subsequently, by merging the "ON" path for faster enable and "OFF" path for disable, the resultant toggle detection signal is generated, as illustrated in FIG. 4.

Figure 5:
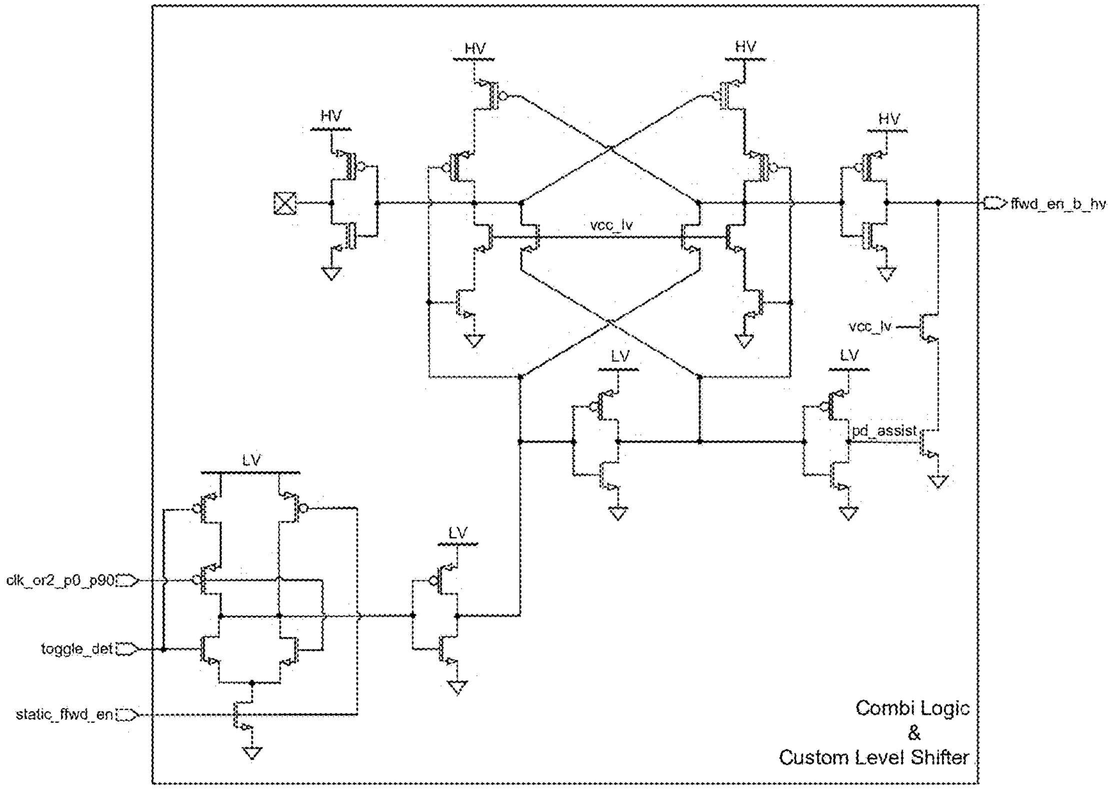
FIG. 5 is a circuitry of level shifter that has a custom low voltage (LV) CMOS combinational logic before level shifting to high voltage (HV) domain in accordance with an embodiment of the present invention.

In accordance with an embodiment of the present invention, the level shifter (22) of the circuitry system is a hybrid level shifter comprising a combination of thin gate and thick gate transistors for controlling the gate of PMOS switch of the feedforward pass gate. The combinational logic is customized to a single stage to reduce the overall delay of the circuit, as shown in FIG. 5.

In accordance with an embodiment of the present invention, the toggling input clock signals are detected by the steps of: transitioning signal based on an input clock; generating an output signal based on the transitioned signal that indicates the presence of toggling input clocks. These steps generate an output signal that signifies the presence of toggling input clocks and de-assert the feedforward enable signal when the input clocks are not toggling.

Furthermore, in an embodiment of the present invention, the method further comprises of level shifting from low voltage to high voltage when feedforward enable signal is generated. The pull-down network for the high voltage level shifter uses thin gate NMOS to allow for faster transition and lower delay. The low voltage supply is also used as gate bias for thin gate NMOS to prevent electrical overstress for the thin gate device if exposed to high voltage. The output stage also has a thin gate NMOS pull down assist that acts as a parallel path to ground to speed up the falling edge of the output signal. As a result, the turn on time of the local feedforward pass gate PMOS can be significantly reduced.

Hereinafter, example of the present invention will be provided for more detailed explanation. The advantages of the present invention may be more readily understood and put into practical effect by these examples. However, it is to be understood that the following examples are not intended to limit the scope of the present invention in any way.

| Description of Circuits | |
|---|---|
| i_ffwd_global_en | Input signal related to global feedforward enable |
| i_clk_p0 | Input clock signals with phase 0 |
| i_clk_p90 | Input clock signal with phase 90 |
| toggle_det | Signal or circuit related to toggle detection |
| clk_or2_p0_p90 | Clock signal resulting from a logical OR operation between phase 0 and 90 |
| static_fwd_en | Signal related to static feedforward enable |
| i_ffwd_local_en | Input signal related to local feedforward enable |
| i_pwrgood_en | Input signal related to power-good enable |

-continued

| Description of Circuits | |
|---|---|
| ffwd_en_b_hv | Feedforward enable signal for high voltage |
| o_toggle_det | Output signal related to toggle detection |
| pd_assist | Signal or circuit related to pull-down assistance |
| vcc_lv | Power supply voltage for low voltage |
| VCCSDL rxdqs | Power supply voltage for the receiving data strobe |
| VCCSDL tcdq | Power supply voltage for the command data queue |
| VCCSDL txdqs | Power supply voltage for the transmitting data strobe |
| VCCR msdl | Power supply for a memory subsystem |
| 200 | Circuitry system |
| 100 | Feedforward amplifier |
| 10 | Clock generator |
| 12 | Toggle detector circuit |
| 20 | Load circuit |
| 22 | Level shifter |
| 24 | Load circuitry |

EXAMPLE

Example 1: Feedforward Implementation

In the context of subsequent discussions, the sought-after characteristics are realized through the utilization of a variable bias voltage to regulate the feedforward pass gate, enabling prompt current sourcing when required, as illustrated in FIG. 6. This design choice addresses the latency of the regulated rail to respond to dynamic current demands, mitigating burst idle burst conditions that might otherwise distort the regulated power with substantial voltage droops and overshoots. Essentially, the feedforward mechanism meets all current requirements, allowing the feedforward amplifier to maintain its idle current state and ensuring stability in the regulated power rail without interruptions.

Figure 7:
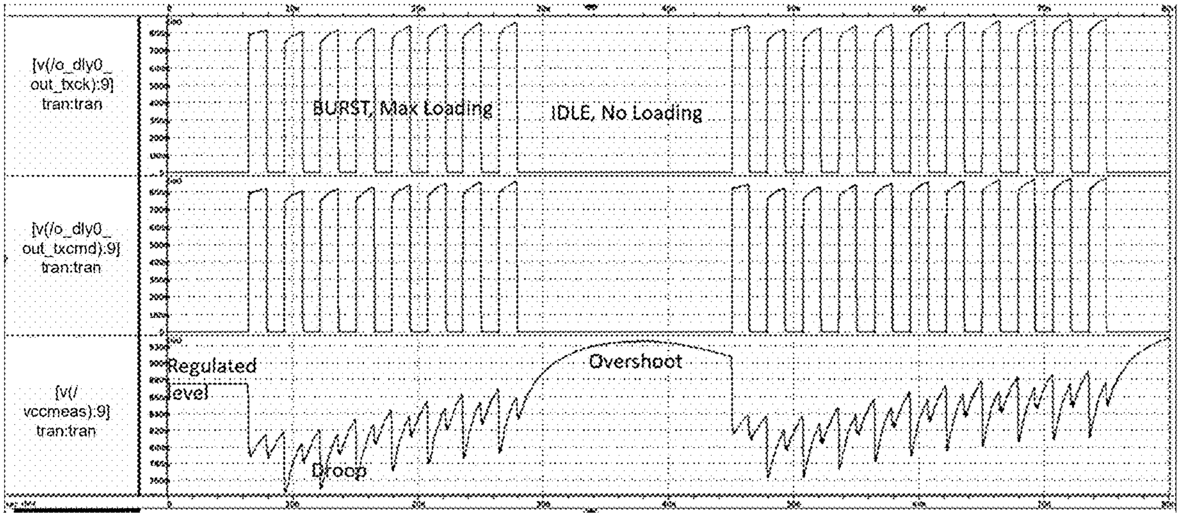
FIG. 7 is a VCC voltage level of the regulated power rail reacting to burst idle burst condition.
Figure 9:
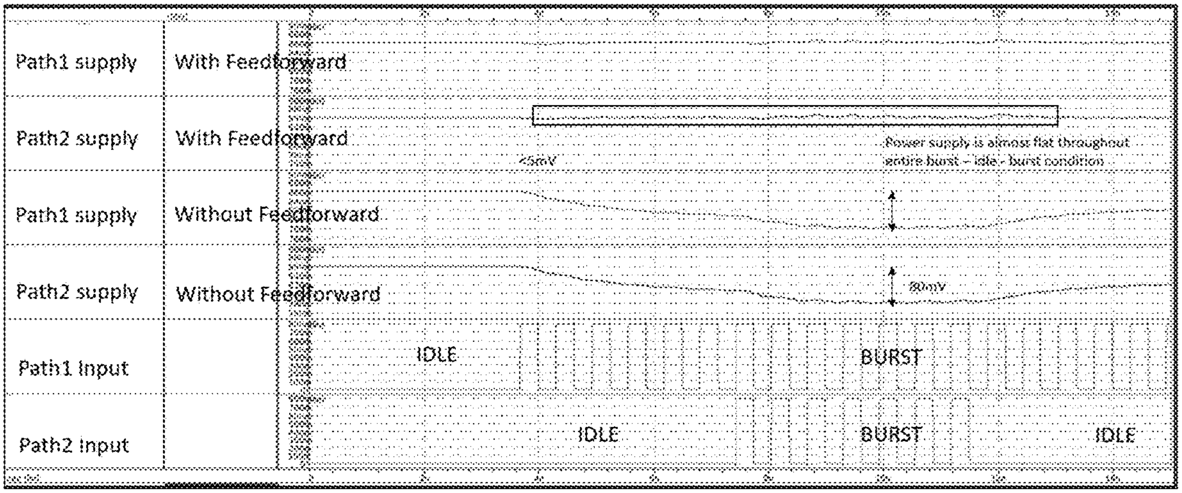
FIG. 9 is a result of VCC voltage level comparing with and without feedforward in accordance with an embodiment of the present invention.

The process tracking reference voltage is actively monitored on the feedforward amplifier 100, obviating the need for adjustments to the amplifier size in response to process variations. Referring to FIG. 7, where this architectural approach conserves significant areas that would otherwise be required to accommodate diverse current demands. It also relaxes stringent specifications on the regulator bandwidth performance. Additionally, FIG. 7 highlights that both the regulator and process tracking reference utilize the same bandgap voltage as their input, effectively mitigating the impact of bandgap variations on the performance calibration of the feedforward circuitries. Notably, it demonstrates that with the feedforward amplifier 100, the droop voltage on the regulated rail is observed in the "without feedforward" waveform is eliminated, resulting in a noteworthy reduction from 80 mV to less than 5 mV which brings to 16× reduction, as shown in FIG. 9.

Figure 10A:
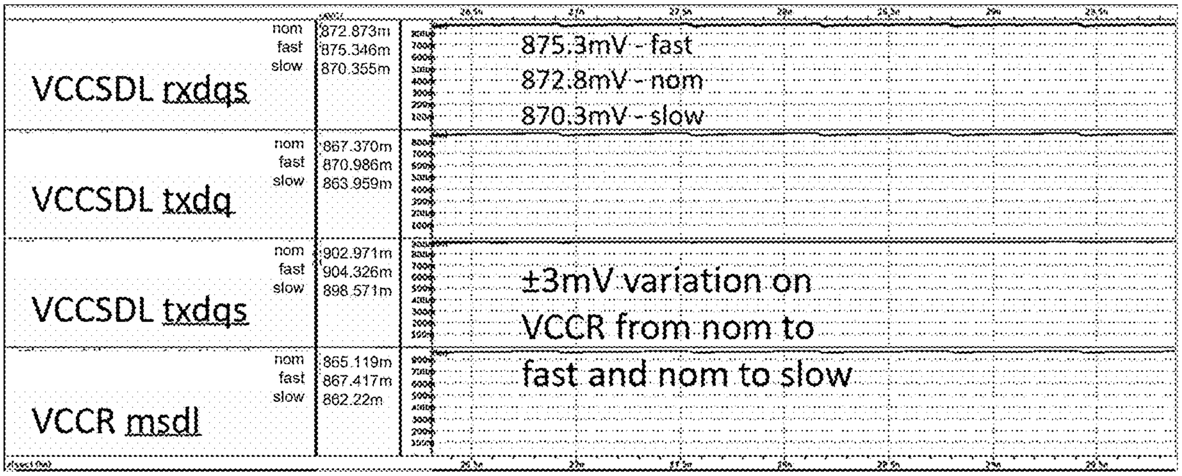
FIG. 10A is a result of VCC voltage level with process tracking bias in accordance with an embodiment of the present invention.
Figure 10B:
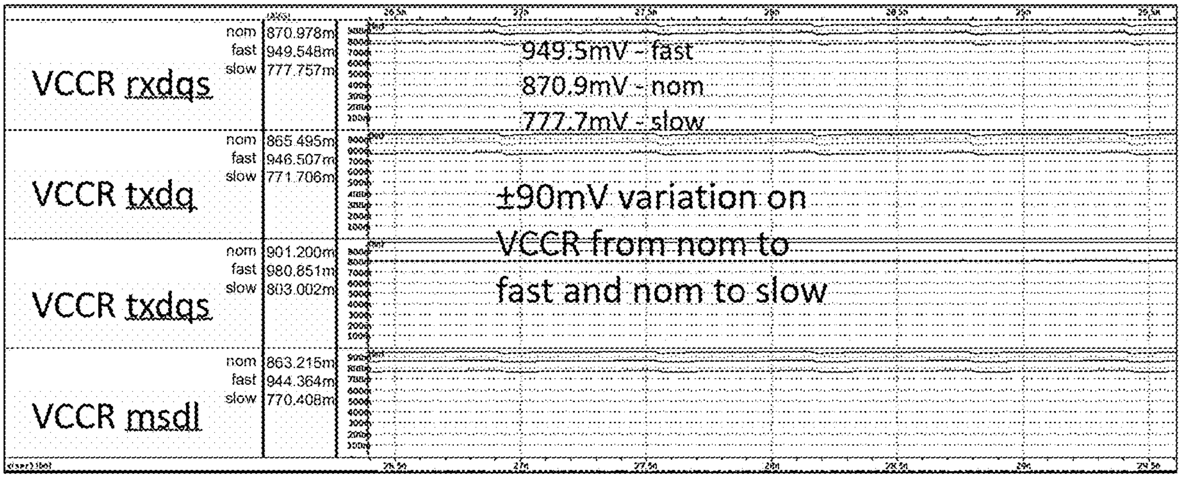
FIG. 10B is a result of VCC voltage level without process tracking bias in accordance with an embodiment of the present invention.

Furthermore, FIG. 10A illustrates that with the incorporation of the process tracking reference, the regulated supply rail experiences variations within +3 mV, without necessitating sizing changes to the feedforward amplifier 100. In contrast, without process tracking bias, as shown in FIG. 10B, the VCC voltage level exhibits approximately 180 mV variations from fast to slow corners, necessitating the feedforward amplifier 100 to increase in size by 20× to 30×.

Example 2: PSRR Capability on Feedforward Power Rail

Figure 11:
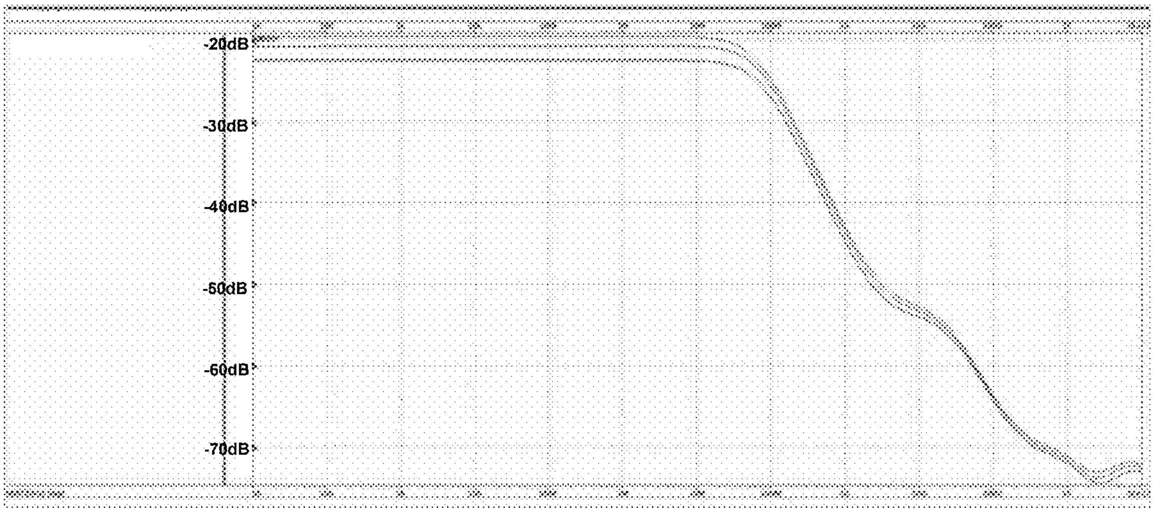
FIG. 11 is a result of power supply rejection ratio capability on feedforward power rail in accordance with an embodiment of the present invention.

After incorporating the feedforward feature, a thorough evaluation was conducted to assess the system's response to changes in the power supply, referred to as the Power Supply Rejection Ratio (PSRR). In the configuration, PSRR relies on the sizing and voltage settings of NMOS, a type of component used for current supply. As depicted in FIG. 11, the PSRR remains robust, maintaining a level of at least-20 dB across various operational scenarios, including fast, normal, or slow conditions.

Notably, unlike the use of a direct pull-up switch that does not inherently address PSRR, the design avoids the need for numerous capacitors to handle PSRR issues. This not only saves space but also prevents excessive strain on the internal regulator, reducing the risk of instability. This approach highlights the advantageous aspects of the feedforward design, emphasizing its improved PSRR performance and its ability to circumvent issues associated with other configurations.

The present Invention overcomes the shortcoming of the prior arts by providing the process for optimizing high-speed CMOS clocking circuitries using the feedforward regulated supply. The optimizing method in present invention helps to counter voltage droop and overshoot scales with different process corners to reduce area usage and calibration time.

While embodiments of the present invention have been illustrated and described, it will be clear that the present invention is not limited to these embodiments only. Numerous modifications, changes, variations, substitutions, and equivalents will be apparent to the person skilled in the art, without departing from the scope of the invention, as described in the claims.

The invention claimed is:

1. A circuitry system for regulating power supply, comprising:

a feedforward amplifier comprising a clock generator and a load circuit for producing current during functional requirements;

wherein the clock generator comprises a toggle detector circuit for generating feedforward enable signal when toggling input clock signal is detected;

wherein the load circuit comprises a feedforward pass gate for receiving feedforward enable signal, a load circuitry, a variable bias voltage controller and a level shifter for controlling the feedforward pass gate, the level shifter configured to level shift from low voltage to high voltage when feedforward enable signal is generated.

2. The circuitry system of claim 1, wherein the feedforward amplifier is connected to a reference voltage tracker having the same bandgap voltage with a regulator as an input voltage.

3. The circuitry system of claim 1, wherein the circuitry system is a CMOS clocking circuit.

4. The circuitry system of claim 1, wherein the toggle detector circuit comprises a delay cell.

5. The circuitry system of claim 1, wherein the level shifter is a hybrid level shifter comprising a combination of thin gate and thick gate transistors.

6. A process for regulating power supply of a circuitry system using a feedforward amplifier, the feedforward amplifier comprising a clock generator and a load circuit for producing current during functional requirements, wherein the clock generator comprises a toggle detector circuit for generating feedforward enable signal when toggling input clock signal is detected; wherein the load circuit comprises a feedforward pass gate for receiving feedforward enable signal, a load circuitry, a variable bias voltage controller and a level shifter for controlling the feedforward pass gate, the method comprising:

activating feedforward pass gate of a load circuit;

detecting toggling input clock signal by a toggle detector circuit;

generating feedforward enable signal when toggling input clock signal is detected;

de-asserting feedforward enable signal when input clock signal is not toggling; and level shifting from low voltage to high voltage when feedforward enable signal is generated, wherein the feedforward amplifier produces current when feedforward enable signal is generated.

7. The process as claimed in claim 6, wherein detecting toggling input clock signals comprises:

transitioning signal based on an input clock; and generating an output signal based on the transitioned signal that indicates the presence of toggling input clocks.

* * * * *